July 12, 1932.  A. W. PRIEBE  1,867,375
METHOD OF ARC WELDING
Filed Aug. 26, 1929

INVENTOR.
Arthur W. Priebe
BY
ATTORNEY.

Patented July 12, 1932

1,867,375

UNITED STATES PATENT OFFICE

ARTHUR W. PRIEBE, OF MILWAUKEE, WISCONSIN, ASSIGNOR TO A. O. SMITH CORPORATION, OF MILWAUKEE, WISCONSIN, A CORPORATION OF NEW YORK

METHOD OF ARC WELDING

Application filed August 26, 1929. Serial No. 388,367.

This invention relates to a method of electrical arc welding and is particularly applicable to the welding of longitudinal seams in tubular articles, such as pipe, employed in the transportation of oil, gas, and other fluids.

One of the obstacles attending the manufacture of tubular articles of the class referred to wherein the weldrod is automatically fed to the work at a speed in proportion to the rate of deposition, is the inability to effect a welding seam having the weld adjacent the ends thereof of a quality comparable with the weld at the intermediate portions. One of the causes for this difficulty lies in the inability to properly control the automatic machines during the starting and the finishing operations adjacent the ends of the article. When the weldrod is in the regions adjacent the end of the tubular article, the arc becomes unstable and it is difficult to maintain the length of arc and the position of the weldrod so as to direct the metal being deposited into the welding groove.

One of the objects of the present invention is to overcome the difficulties and obstacles above referred to and to provide a method of welding longitudinal seams in tubular articles wherein a seam of uniform quality extending the full length of the article may be effected.

Another object of the invention is to provide a method of heat treating the weld in the regions adjacent the ends to render the same more ductile.

Other objects will appear hereinafter.

The preferred embodiment of the invention is illustrated in the accompanying drawing in which.

Figure 1:
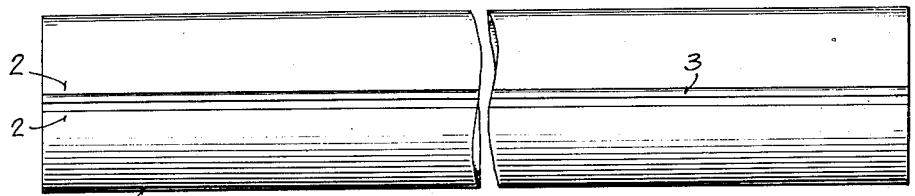
Figure 1 is a top plan view of the pipe blank to be welded.
Figure 2:
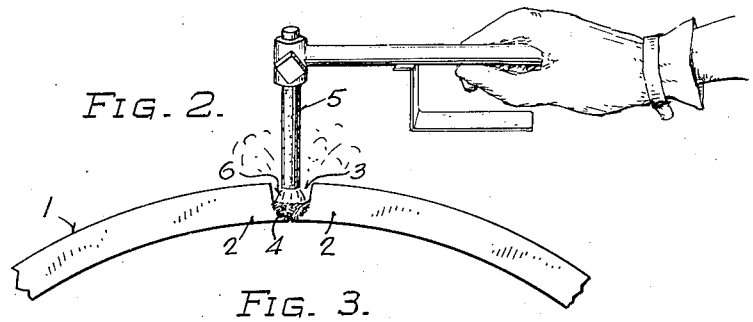
Fig. 2 is an end elevation of the same showing the preliminary welding operation.

It has been discovered that the magnetic flux, set up in the tubular article by the electric current passing from the weldrod through the article, has a definite relationship to the control of the arc and the quality of the weld resulting therefrom. It has been further found that the longitudinal position of the weldrod with respect to the article has a definite bearing upon the magnetic conditions set up in the article, and that when the weldrod approaches or is in a region adjacent the ends of the article, the magnetic flux conditions have an adverse effect upon the required control and stability of the arc.

It is proposed by the present invention to weld the seam in the regions adjacent the ends of the article by hand manipulation of the weldrod, that is, the weldrod is manually fed to the arc and the position and length of the arc is accurately controlled by the operator to effect the desired weld.

It has been found that a region extending inwardly from the ends of the article for a distance of from six to ten or more inches, depending upon the current strength employed, the size and thickness of the article, and other factors employed, has the undesirable magnetic flux conditions hereinbefore referred to and that by manually welding this region a seam of uniform quality throughout the entire length of the article may be effected.

Referring now to the drawing for a better understanding of the invention, a pipe blank 1 is preferably formed from a flat sheet of metal converted into tubular shape with the side edges 2 in longitudinal alignment to provide the seam to be welded.

The edges 2 are preferably chamfered as shown to form a welding groove 3 therebetween for receiving welding metal 4. The welding metal is deposited from a fusible metallic weldrod 5 by means of an electric arc 6 established between the weldrod and the edges.

Figure 3:
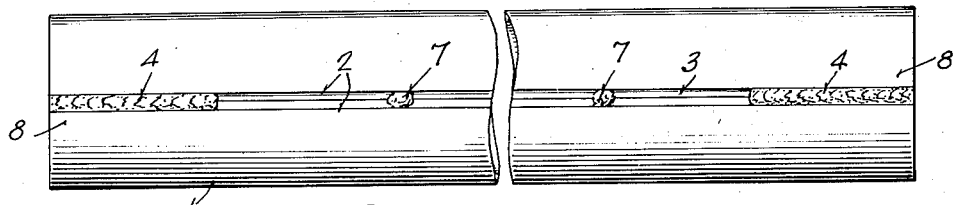
Fig. 3 is a top plan view of the pipe after the preliminary welding operation has been completed.

In order to maintain the edges in proper alignment during the welding operation, it as been found desirable to tack weld the edges together at spaced intervals as indicated by the numeral 7 in Fig. 3. This tack welding may be effected in any desired manner, manually or by automatic machines.

After the edges are brought together in the manner referred to, the end portions 8 are manually welded for a distance of about nine or ten inches, depending upon the diameter of the pipe and other factors referred to, the distance being determined by the dimensions of the regions wherein the magnetic flux conditions in the pipe are detrimental to the maintenance of proper control of the welding by automatic welding machines.

In performing the manual operation, it has been found desirable to deposit a layer of metal in the seam for the full length of the region referred to and thereafter quench the deposited portion with a suitable quenching medium and to then deposit a second layer of metal over the first. By such procedure, the first deposited portion is hardened and, when the second layer is deposited over the first layer, the heat resulting therefrom anneals the first deposited layer and effects a stronger and more ductile weld.

This characteristic of the weld is particularly desirable when the end portion of the tubular article is subsequently formed into a bell forming a portion of a joint for uniting the adjacent sections of the pipe line.

Figure 4:
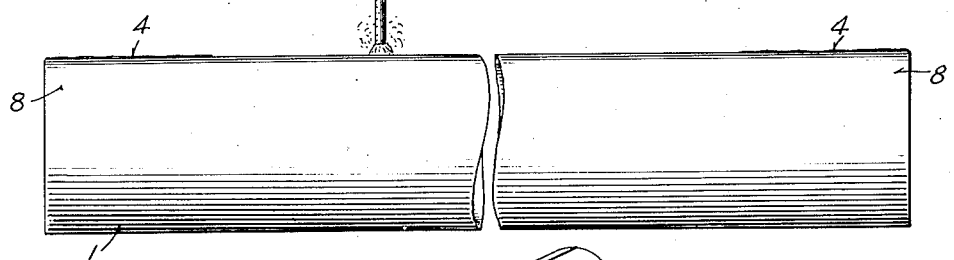
Fig. 4 is a side elevation illustrating the final welding operation.
Figure 5:
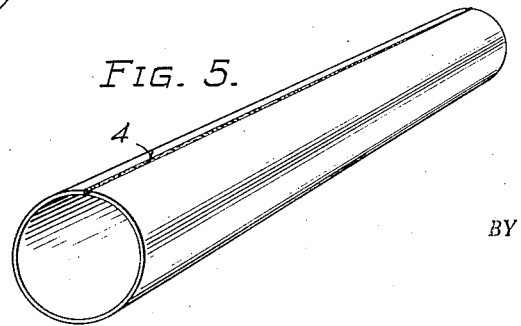
Fig. 5 is a perspective view of the completed pipe section.

In the final welding operation, as shown in Fig. 4, the welding is effected by an automatic feeding mechanism 9 wherein the weld-rod 10 is fed toward the work at a rate controlled by the electrical characteristics of the arc while the weldrod is being moved along the seam at the desired speed to effect a longitudinal weld of the desired quality.

By the present invention, the advantages of automatic welding are obtained without sacrificing the quality of the seam adjacent the ends. While the manual operation has been described as preceding the automatic operation, it is understood that the same may be reversed, if desired, without departing from the applicant's invention.

The invention may have various modifications as defined by the accompanying claims.

What is desired to be protected by Letters Patent is:

1. The method of electric arc welding which comprises depositing a layer of weld metal in the seam to be welded, quenching said deposited metal, and thereafter annealing the quenched metal by depositing another layer of molten metal over the quenched layer and allowing it to gradually cool.

2. The method of electric arc welding which comprises depositing a layer of molten weld metal, quenching the deposited layer to rapidly lower its temperature, and subsequently depositing another layer of weld metal in the seam to complete the weld and to anneal the first deposited layer to thereby improve the ductility of and toughen the welded seam.

3. The method of arc welding longitudinal seams in tubular articles which comprises tacking the edges to be welded to effect the desired alignment thereof, manually controlling the arc to deposit a layer of metal in the region adjacent the ends of the tubular article, quenching said deposited layer and thereafter superimposing the second layer of deposited metal while manually controlling the arc, and automatically controlling the welding operation in accordance with changing characteristics of the arc while welding the intermediate portions between said regions.

4. The method of electric arc welding which comprises depositing a layer of weld metal in the seam to be welded, quenching the deposited metal, and thereafter depositing another layer of weld metal over the quenched layer.

5. A method of electric arc welding which comprises depositing a layer of weld metal in the seam to be welded for a part of the total length thereof, quenching the deposited metal and thereafter depositing a second layer of weld metal over the quenched layer to complete the weld for that part of the seam, and then completing the weld of the seam.

6. The method of electric welding which comprises depositing a relatively thin layer of weld metal in the same to be welded, quenching the depositing metal to enable the subsequent pass to be made thereover on relatively cool metal, and thereafter depositing a second layer of weld metal over the quenched layer to complete the welding of the seam for the full thickness of the parts.

In testimony whereof I have hereunto signed my name at Milwaukee, Wisconsin, this 22nd day of August, 1929.

ARTHUR W. PRIEBE.